(12) United States Patent
Ionescu et al.

(10) Patent No.: US 11,455,258 B2
(45) Date of Patent: *Sep. 27, 2022

(54) METHOD AND SYSTEM FOR DATA VALIDATION USING MEMRISTORS

(71) Applicant: CYBERSWARM, INC., San Mateo, CA (US)

(72) Inventors: Octavian Narcis Ionescu, Ploiesti (RO); Viorel-Georgel Dumitru, Ploiesti (RO); Constantin-Ionut Marica, Ploiesti (RO); Victor-Andrei Marica, Ploiesti (RO); Miha Tiberiu Luca, Bucharest (RO); Stefan-Laurentiu Pircalabu, Ploiesti (RO)

(73) Assignee: CYBERSWARM, INC., San Mateo, CA (US)

( * ) Notice: Subject to any disclaimer, the term of this patent is extended or adjusted under 35 U.S.C. 154(b) by 456 days.

This patent is subject to a terminal disclaimer.

(21) Appl. No.: 16/532,003

(22) Filed: Aug. 5, 2019

(65) Prior Publication Data

US 2021/0042243 A1 Feb. 11, 2021

(51) Int. Cl.
*G06F 12/14* (2006.01)
*G11C 13/00* (2006.01)
(Continued)

(52) U.S. Cl.
CPC ........ *G06F 12/1408* (2013.01); *G06F 21/602* (2013.01); *G06F 21/606* (2013.01); *G11C 11/5685* (2013.01); *G11C 13/0069* (2013.01)

(58) Field of Classification Search
CPC .............. G06F 21/1408; G06F 21/602; G06F 21/606; G11C 11/5685; G11C 13/0069
(Continued)

(56) References Cited

U.S. PATENT DOCUMENTS 9,235,714 B1 * 1/2016 Cignetti ............. G06F 21/6218
10,700,878 B1 * 6/2020 Ryu ........................ G11C 7/24
(Continued)

FOREIGN PATENT DOCUMENTS

BR 112019019854 A2 * 4/2020 ............ H03M 13/00

OTHER PUBLICATIONS

Chhetri et al., 2019 IEEE, "Crypto-System: A Modified Ceaser Cipher", pp. 251-254 (Year: 2019).*
Makala et al., 2017 IEEE WiSPNET, "A Fast Encryption and Compression Technique on SMS Data", pp. 1213-2017 (Year: 2017).*
Eric Charbrow, "Encrypting the Internet of Things", Sep. 6, 2016, retrieved from https://www.bankinfosecurity.com/encrypting-internet-things-a-9382.
(Continued)

*Primary Examiner* — Khalil Naghdali
(74) *Attorney, Agent, or Firm* — DLA Piper LLP (US)

(57) ABSTRACT

A system and method for generating encryption keys on multiple devices, without transferring the keys. At least one sender memristor is set using at least one sender setting value. At least one sender reading value is applied to the at least one sender memristor to generate at least one sender output value. A string of characters is determined from the at least one output value based on a sender table. Data is encrypted with the string of characters. The encrypted data is transmitted to a receiver through a first channel. The at least one sender setting value or the at least one sender reading value or both is transmitted to the receiver through a second channel different from the first channel. The at least one sender setting value or the at least one sender reading value or both is applied to at least one receiver memristor to generate at least one receiver output value. A receiver table is used to determine the string of characters from the at least (Continued)

Encrypted data transfer between 2 devices one receiver output value. The encrypted data is decrypted with the string of characters from the receiver table.

16 Claims, 8 Drawing Sheets

(51) Int. Cl.
  *G06F 21/60* (2013.01)
  *G11C 11/56* (2006.01)
(58) Field of Classification Search
  USPC .......................................................... 713/189
  See application file for complete search history.

(56) References Cited

U.S. PATENT DOCUMENTS

| | | | | |
|---|---|---|---|---|
| 2009/0198618 A1* | 8/2009 | Chan | ..................... | G06F 21/445 |
| | | | | 707/E17.014 |
| 2014/0028404 A1* | 1/2014 | Kihara | ..................... | H03K 3/84 |
| | | | | 331/78 |
| 2014/0268994 A1* | 9/2014 | Rose | ........................ | G09C 1/00 |
| | | | | 365/148 |
| 2016/0328578 A1* | 11/2016 | Plusquellic | .............. | G09C 1/00 |
| 2018/0316493 A1* | 11/2018 | Kvatinsky | ............. | H04L 9/3242 |
| 2020/0213140 A1* | 7/2020 | Cambou | ............... | H04L 9/0643 |

OTHER PUBLICATIONS

Brian Buntz, "Top 10 Reasons People Aren't Embracing the IoT", IoT World of Today, Apr. 20, 2016, retrieved from https://www.iotworldtoday.com/2016/04/20/top-10-reasons-people-aren-t-embracing-iot/.

Ahmed Banafa, "3 Major Challenges IoT is Facing", Mar. 21, 2017, retrieved from https://www.bbvaopenmind.com/en/technology/digital-world/3-major-challenges-facing-iot/.

Abstract of Teng Zhang et al., "High-Speed True Random Number Generation Based on Paired Memristors for Security Electronics", Naotechnology, vol. 28, No. 45, Sep. 2017, retrieved from https://www.researchgate.net/publication/319558952_High-speed_True_Random_Number_Generation_Based_on_Paired_Memristors_for_Security_Electronics.

Yu-Tzu Chiu, "A MemristorTrue Random-Number Generator", Jul. 13, 2012, retrieved from https://spectrum.ieee.org/semiconductors/memory/a-memristor-true-randomnumber-generator.

* cited by examiner

Figure 2: System used for generating encryption keys based on the memristor matrix of Figure 1a Figure 3: Table used for generating encryption keys on multiple devices Figure 4: Memristor key generator as part of a communication system similar to "Cybersecurity System for Internet of Things Connected Devices" (US 2019/0132340 A1)

Figure 5: Memristor array on the source and multiple IoT devices that have matching memristors with the memristor array of the source Figure 6: Encrypted data transfer between 2 devices

METHOD AND SYSTEM FOR DATA VALIDATION USING MEMRISTORS

FIELD OF THE INVENTION

The invention described herein relates mainly to cyber security, providing safe data transfer between wired and wireless connected devices as well as improved device security, more specifically it relates to data encryption and data integrity check for data sent to or received from any type of device. Some embodiments may be used for IoT (Internet of Things) as they are lightweight, however, other embodiments could be used for more sensitive applications being capable to ensure a very strong encryption of data.

BACKGROUND

A factor impeding acceptance of IoT devices is their security and data privacy. These requirements are hard to satisfy, especially for IoT devices that have low processing power and/or battery life. Data encryption would solve many of these problems, as it can be used for both data privacy and also for checking the integrity of the data sent to or received from an IoT device, preventing any malicious party to modify or read the data. This, however, has proven to be a daunting task for anyone attempting to fix the security problem.

Since IoT devices, can be so easily hacked, their already limited processing power may be hijacked as part of a so-called botnet. One example of a botnet is Mirai that was used for DDoS (Distributed Denial of Service) attacks on the servers of services like Twitter, Netflix and PayPal in 2016. Countless IoT devices that power everyday technology like closed-circuit cameras and smart-home devices were hijacked by the malware, and used against the servers.

Nowadays the majority of state-of-the-art solutions to the cybersecurity problem for IoT and other kinds of devices are using software-based systems and algorithms but these solutions haven't yet proved to be secure enough. Most of the software cybersecurity solutions are based on analysis of attacks that have already happened, developing patterns of various malicious activities and taking decisions based on them. The obvious problem with these solutions is that the system will not know how to identify the threat if a new kind of attack is used. Another known issue of software based cyber security solutions is that they are deployed over other software programs like operating systems. These operating systems contain various bugs or software errors that can be exploited by hackers to gain access to the protected system and damage it.

SUMMARY

A system and method for generating encryption keys on multiple devices, without transferring the keys. At least one sender memristor is set using at least one sender setting value. At least one sender reading value is applied to the at least one sender memristor to generate at least one sender output value. A string of characters is determined from the at least one output value based on a sender table. Data is encrypted with the string of characters. The encrypted data is transmitted to a receiver through a first channel. The at least one sender setting value or the at least one sender reading value or both is transmitted to the receiver through a second channel different from the first channel. The at least one sender setting value or the at least one sender reading value or both is applied to at least one receiver memristor to generate at least one receiver output value. A receiver table is used to determine the string of characters from the at least one receiver output value. The encrypted data is decrypted with the string of characters from the receiver table.

BRIEF DESCRIPTION OF THE DRAWINGS

This invention is focused on providing encryption for communications networks. One example is described in "Cybersecurity System for Internet of Things Connected Devices" (US 2019/0132340 A1) published patent application. Therefore the drawings are used to describe the encryption method of this disclosure, in relation with the previous published patent application.

DETAILED DESCRIPTION

By using a memristor array and the system and the method described in published patent application "Cybersecurity System for Internet of Things Connected Devices" (US 2019/0132340 A1), which is incorporated herein by reference in its entirety, and on other similar embodiments, we found a way to generate encryption/decryption keys on multiple devices (thus the keys are never sent) at hardware level. This is possible using properties of memristors and a separate channel for transferring sensitive information.

Figure 1A:
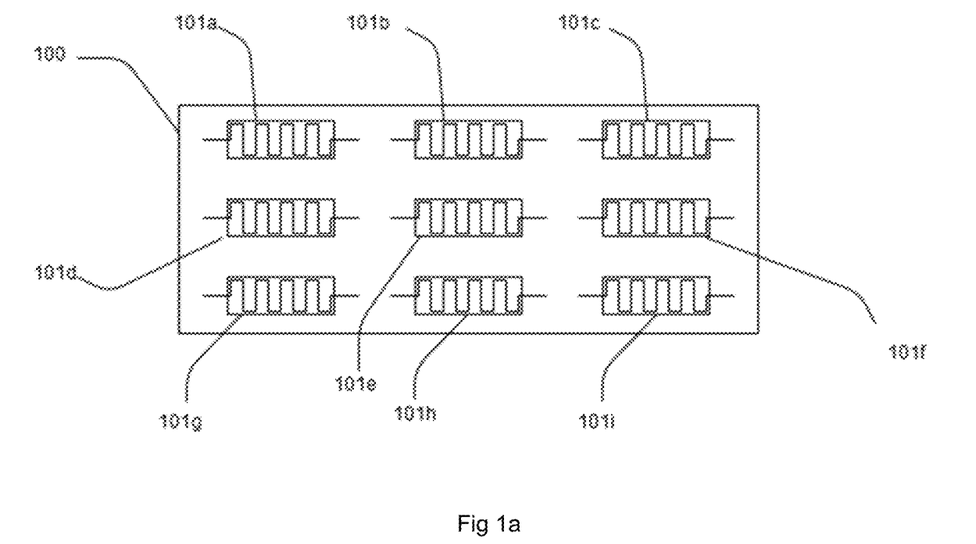
FIG. 1a is a matrix of memristors that may be used to generate encryption and decryption keys.

As it can be seen in FIG. 1a, multiple memristors can be arranged to form a matrix, or a vector. These memristors can be used to generate encryption keys. The basis for the random key issuing is that a memristor can be set at random resistance values using different quantities of energy. The resistance values are obtained by setting the memristors in a particular resistive state using a setting value and then reading the memristors with a particular reading voltage value.

The memristors could be set in the particular desired resistance state by different methods like applying a setting value such as voltage pulse or a voltage pulse sequence, or with particular parameters like voltage amplitude and pulse duration or by applying a voltage sweep or a voltage sweep sequence, with particular parameters like maximum voltage value, number of steps, steps duration, etc.

Figure 1B:
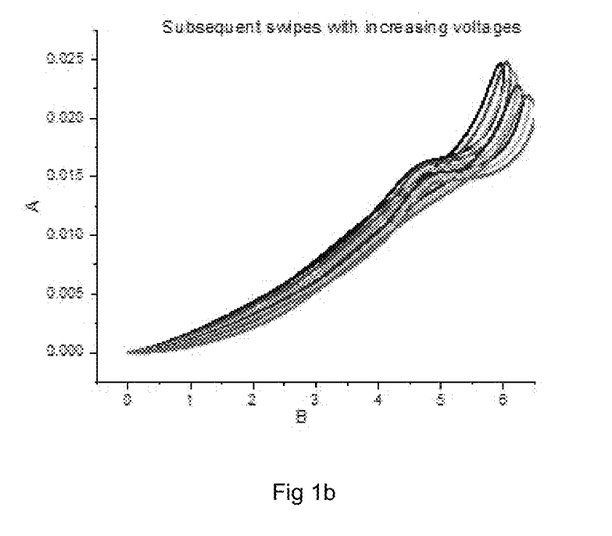
FIG. 1b is an example of setting a memristor in different resistive states.
Figure 1C:
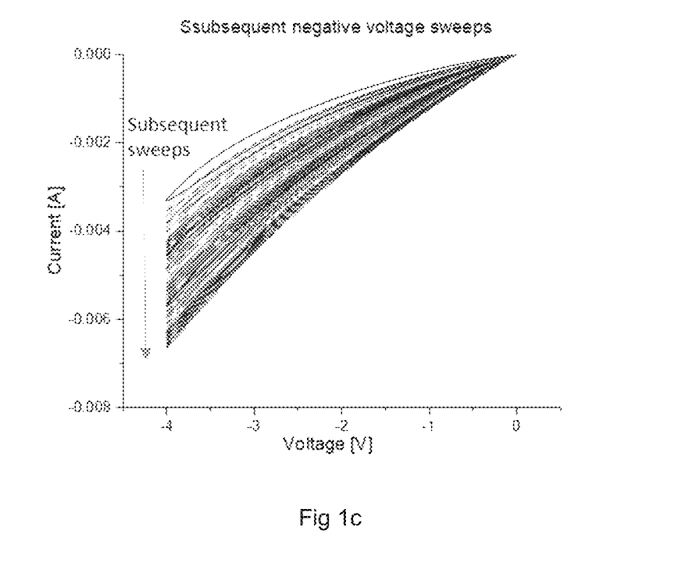
FIG. 1c is another example of setting a memristor in different resistive states.

FIG. 1b shows an example of setting a memristor in different resistive states employing subsequent positive voltage sweeps with increasing voltage limit values. FIG. 1c shows an example of setting a memristor in different resistive states employing subsequent negative voltage sweeps with the same voltage limit. While in the examples shown in FIG. 1b and FIG. 1c, the memristor is set in different states by employing sequences of positive and respective negative voltages, it should be understood that particular memristor states could be obtained also by a suitable combination of positive and negative voltage sweeps or sequences of positive and negative voltage pulses.

Figure 1D:
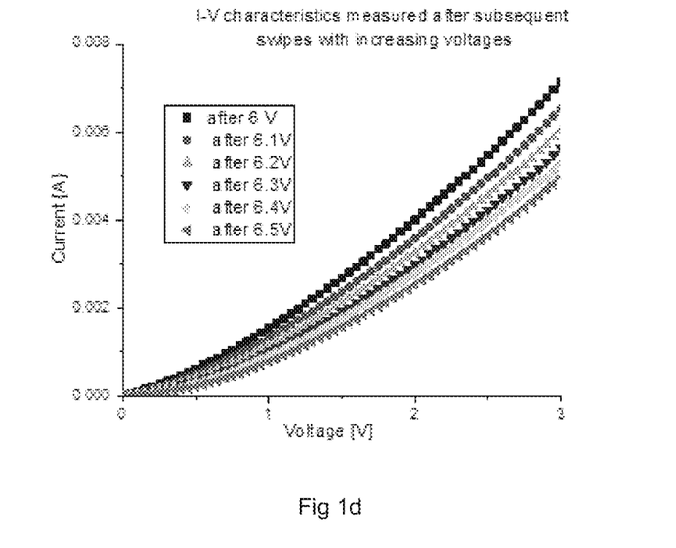
FIG. 1d shows the I-V (current-voltage) characteristics measured on a memristor which was set as depicted in FIG. 1b.
Figure 1E:
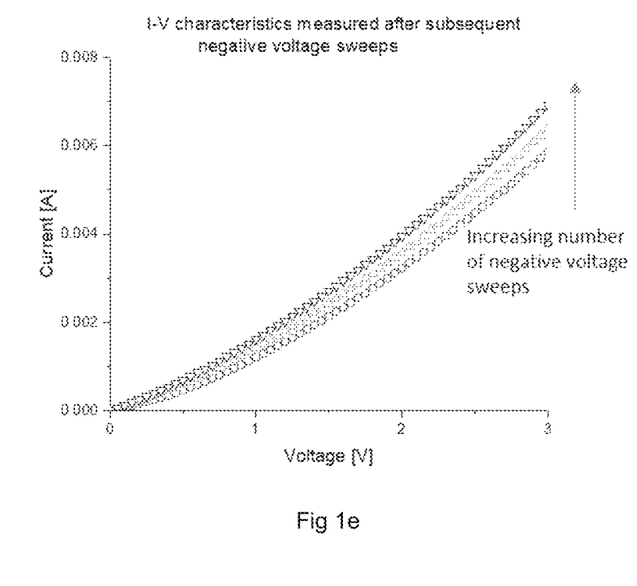
FIG. 1e shows the I-V characteristics measured on a memristor which was set as depicted in FIG. 1c.
Figure 1F:
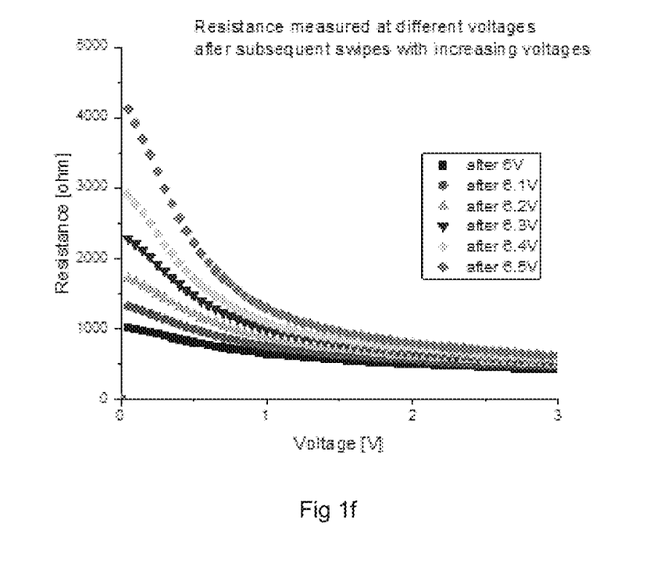
FIG. 1f shows the resistance values measured at different reading voltage values for the memristor set in different states using the voltage sweeps from FIG. 1b.
Figure 1G:
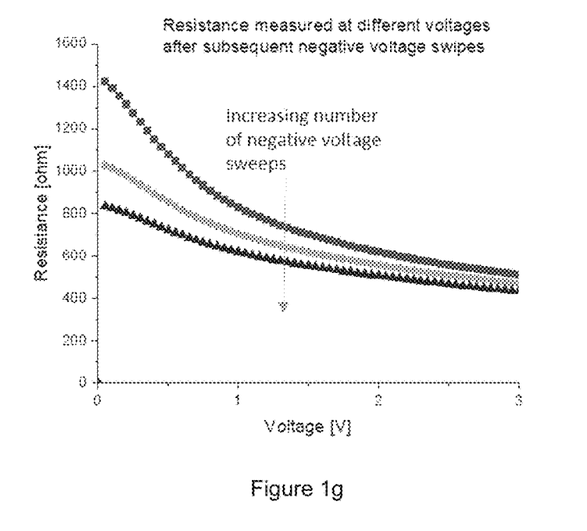
FIG. 1g shows the resistance values measured at different reading voltage values for the memristor set in different states using the voltage sweeps from FIG. 1c.

The reading of memristor resistance or a corresponding voltage or current is done using smaller quantities of energy (voltage reading values) than the ones used to set the actual value in order to not alter the set memristor state (the change of the memristor state occurs only after a certain energy threshold has been reached). The memristor set in different resistive states display nonlinear I-V characteristics. For instance, in FIG. 1d are shown the I-V characteristics measured after the voltage sweeps shown in FIG. 1b. Also in FIG. 1e are shown the I-V characteristics measured after few of the voltage sweeps shown in FIG. 1c. Due to the nonlinear I-V characteristics, the measured resistance value or a corresponding voltage or current of the memristor depends on the voltage at which the measurements are done. In this way, multiple resistance values or corresponding voltages or currents could be obtained from a memristor set in a particular state, by reading its resistance or a corresponding voltage or current at different voltage values. For instance, in FIG. 1f are shown the resistance values measured at different reading voltage values for the memristor set in different states using the voltage sweeps from FIG. 1b. As could be seen, for a particular state, the measured resistance depends strongly on the voltage value at which it is read. For instance, after setting the memristor with the 6.5 V voltage sweep, its resistance measured at 0.1 V is around 3900 ohms, measured at 0.5V is around 2200 ohms, measured at 1V is around 1300 ohms, measured at 2 V is around 800 ohms and measured at 3V is around 600 ohms. Also, as could be seen, the resistance obtained by reading it at a certain voltage value depends also on the particular state in which the resistor was set. Similar behavior could be observed from FIG. 1g, which displays the resistance values measured at different reading voltage values for the memristor set in different states using the voltage sweeps from FIG. 1c.

In this way, by using, for instance, 30 different voltage values (from 0.1V to 3V with a step of 0.1V) to read the same memristor, there will be 30 different output values that could be used to establish an encryption key. In addition, considering the fact that each memristor could be set in various states, the result will be a large variety of random values to be used for issuing a random encryption key. One way in which the values resulted after reading the memristor at different voltages may be interpreted is by using intervals of resistance or corresponding voltage drops to transform the resistance value or a corresponding voltage or current into an ASCII (American Standard Code for Information Interchange) character or any other type of character encoding. For example, we could define that if the electrical resistance value read from a given memristor is between 900 ohms and 1000 ohms (or a corresponding voltage or current has a corresponding range of values), that could be interpreted as character "A", or if the electrical resistance is between 2500 and 2600 ohms (or a corresponding voltage or current has a particular range of values), it could be interpreted as a string of characters, or partial encryption key "XHT2Xv&7", for example. By using this method, we could generate keys of arbitrary size by using very few memristors.

Multiple memristors can be arranged to form a matrix, or a vector as shown in FIG. 1a. These memristors can be used to generate encryption keys, as it was explained previously, by setting them with setting values in particular states and then reading them using different voltage values. The same voltage value (let's say 0.5V) could be used on all of the memristors of the 3 by 3 matrix of FIG. 1, generating 9 different electrical resistance values or corresponding voltages or currents (as each memristor is set to a different resistance state). By interpreting all these electrical resistance values, or corresponding voltages or currents as characters, we can generate a string of 9 completely random characters to be used as an encryption key (or even a longer string of characters, if the electrical resistance value or a corresponding voltage or current is interpreted not as only one character, but as a string of characters of arbitrary size).

Figure 2:
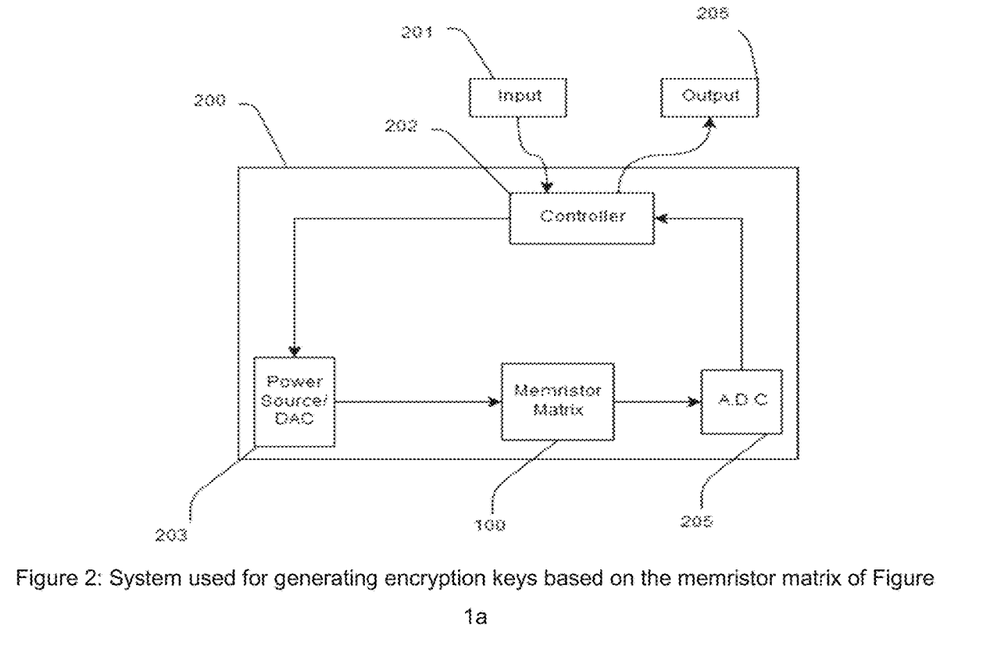
FIG. 2 is a system used for generating different electrical resistance values, by reading memristors at different voltage values.

The system of FIG. 2 is used to generate electrical resistance based on voltage sweeps or voltage pulses. This system uses a memristor matrix as it was shown in FIG. 1a, on which various voltage sweeps or voltage pulses are applied. The voltage sweeps or voltage pulses are received as the input (201) of this system (200), which is fed to the controller (202) that commands a power source or digital to analog converter (203) to apply a voltage sweep or voltage pulse value to each memristor (or some memristors that were selected) of the memristor matrix (100). The resistance values (or corresponding voltages or currents) are read by the controller (202) after passing through an analog to digital converter (205), resulting in an output (206) that may be used to generate encryption keys.

Figure 3:
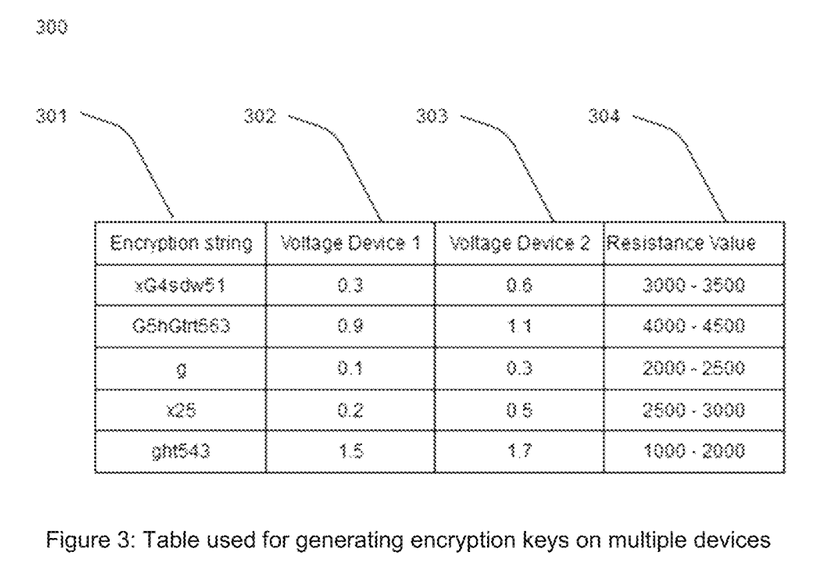
FIG. 3 is a table that is used to generate encryption keys based on the resistance values resulted from reading the memristors with different voltage values.

The encryption keys are generated after translating the electrical resistance values (or corresponding voltages or currents) that were read using the system of FIG. 2 into strings of characters, by using a table similar to the one of FIG. 3, in which the first column (301) represents the string of characters assigned to a particular electrical resistance value (or corresponding voltage or current) (304). The second (302) and third (303) columns represent the voltage values used to read the memristors of the receiving device that need to be sent (over the GSM) to two separate devices (or however many devices it can send data to), to generate the same encryption key.

Using the table in FIG. 3 and the memristors of FIG. 1a with the system of FIG. 2 we can to generate encryption keys of any size by concatenating the strings resulted after reading the memristors with the voltage values and transforming the electrical resistance values (or corresponding voltages or currents) to strings of characters. After the key is used for encryption/decryption, that key may be deleted, and another key may be generated for the following session of communication. As an abstract example of the entire process of data transmission and encryption, we generate two voltage values on Device 1(302), namely 0.3V and 0.1V. By translating these values, using the table in FIG. 3, we would get the string "xG4sdw51g", which we can use as an encryption key; it's worth mentioning that the table in FIG. 3 may not have the voltage values that need to be applied on the sender device memristors to generate electrical resistance values stored in memory, but only the resistance value intervals and the strings of characters attributed to them (this way, in the unlikely case someone gains software access to the device, he won't be able to know the memristor state or value). We encrypt the data that needs to be sent, then delete the encryption key, and send the voltage values to Device 2(303), namely 0.6V and 0.3V. Device 2 receives the encrypted data (over the first channel) and generates the decryption key using the voltage values received over the second channel, by using the table of FIG. 3 or a similar table in order to decrypt the received data. This method can be used to generate both symmetrical and asymmetrical encryption/decryption keys, by using tables similar to the one of FIG. 3.

Another method of the process of communication between two devices is by not only reading resistance values (or corresponding voltages or currents) using low voltage sweeps (not modifying the memristor state), but also applying higher voltage sweeps or voltage pulses to modify the state of the memristor, followed by a low voltage pulse to read the resistance value (or corresponding voltage or current) of that memristor in its resulted state. For example, let's say on the sender device we apply 0.4V on a memristor and it results in a resistance value between 2500 ohms and 3000 ohms (or a corresponding voltage or current range) resulting in string "x25" (based on FIG. 3), then we apply a sweep or pulse 6V on the memristor, for 1 second, changing its state; we then read it with 0.4V again, resulting in a resistance value between 4000 ohms and 5000 ohms (or corresponding voltage or current range), and convert it to the string of characters "G5hGtrt563". The same process (or a similar process) will be applied on the memristor of the receiver device, by sending the information about how to generate the key over the GSM channel. By changing the states of both the memristors, of the sender and of the receiver, they can still generate matching keys. This method of generating and encryption is good for securing the communication between two or more systems that have matching memristors, as only the two systems (or multiple systems, that have matching memristors) are able to encrypt and decrypt data sent or received.

As stated above, the key generation on multiple devices can happen not only by reading memristors values at different, low voltage pulses, but also by changing the memristor state during the key generation (by applying high voltage sweeps or voltage pulses), and then reading it with a low voltage. This modification of the memristor state can happen in various ways; by choosing to apply a voltage pulse or a voltage sweep for a period of time (those sweeps or pulses may have negative or positive values, to increase the electrical resistance value or to decrease it). We can choose the intensity of the voltage sweeps or pulses (to be 4V or 6V or 10y), the time we apply that voltage on the memristor (0.5 seconds, 1 second, 2 seconds etc.) and various combinations of those parameters, which will result in different resistance values (or corresponding voltages or currents), and different encryption keys. The same process must be applied on the sender and the receiver of data, to generate the key needed to encrypt/decrypt data.

In order to prove its capacity to be used as encryption device, the memristor matrix was added also to a system (400) (FIG. 4) similar to the one described in the published patent application "Cybersecurity System for Internet of Things Connected Devices" (US 2019/0132340 A1), to encrypt/decrypt data using a random key generated as described above. In order to demonstrate the concept, two systems (400) of this kind were placed on two different end points, enabling secure communication between those two points. The security of the communication and of the transmitted data is ensured by the fact that only the 2 systems that are placed before the two endpoints of the communication (which can be any type of device, including IoT devices) can generate matching encryption/decryption keys needed to encrypt and decrypt the data received, by using the memristor based key generators (200) placed on them. The sender system generates the encryption key by reading the memristors with different random voltage values, and creates an encryption key. The system of the sender then encrypts the data that needs to be sent, and sends it to the receiver using a first channel (407), such as a wired channel based on an Ethernet protocol, while also sending the voltages with which it generated the encryption key to the receiver (or other voltages, that when applied to the memristor or memristor matrix of the receiver generates the same key or an asymmetrical matching key) using a second channel (409). The second channel may employ a wireless protocol, such as a GSM, GPRS, CDMA, LTE or G5 based protocol The receiver system intercepts the GSM message containing the voltage values that it must apply on the memristor matrix it has, and generates the key needed to decrypt the data received over the Ethernet channel (407). The two systems used to protect the endpoints also have two matching tables (see FIG. 3) for translating the resistance values or corresponding voltages or currents into strings of characters. For example, if the sender device has the character string "x25" for when the electrical resistance of a memristor is between 2500 ohms and 3000 ohms (or a corresponding voltage or current range), on the receiver device the same string "x25" must be generated, when reading with a voltage value, an electrical resistance between 2500 ohms and 3000 ohms (or a corresponding voltage or current range); this way, both devices can generate matching keys, without the need to send the key itself. The only thing that is sent over the GSM channel, are voltage values that must be applied to the memristors. In the unlikely case that both the voltage values sent over the GSM channel and the data sent over the Ethernet are intercepted by a malicious party, it wouldn't be possible to generate the decryption key, using only the voltage values, as you would need the physical matrix of memristors to generate it, by reading the memristors using the voltage values intercepted. The memristor matrix can also be modified using the GSM channel, changing the matrix values on both sides, so that they will still generate matching keys.

Figure 4:
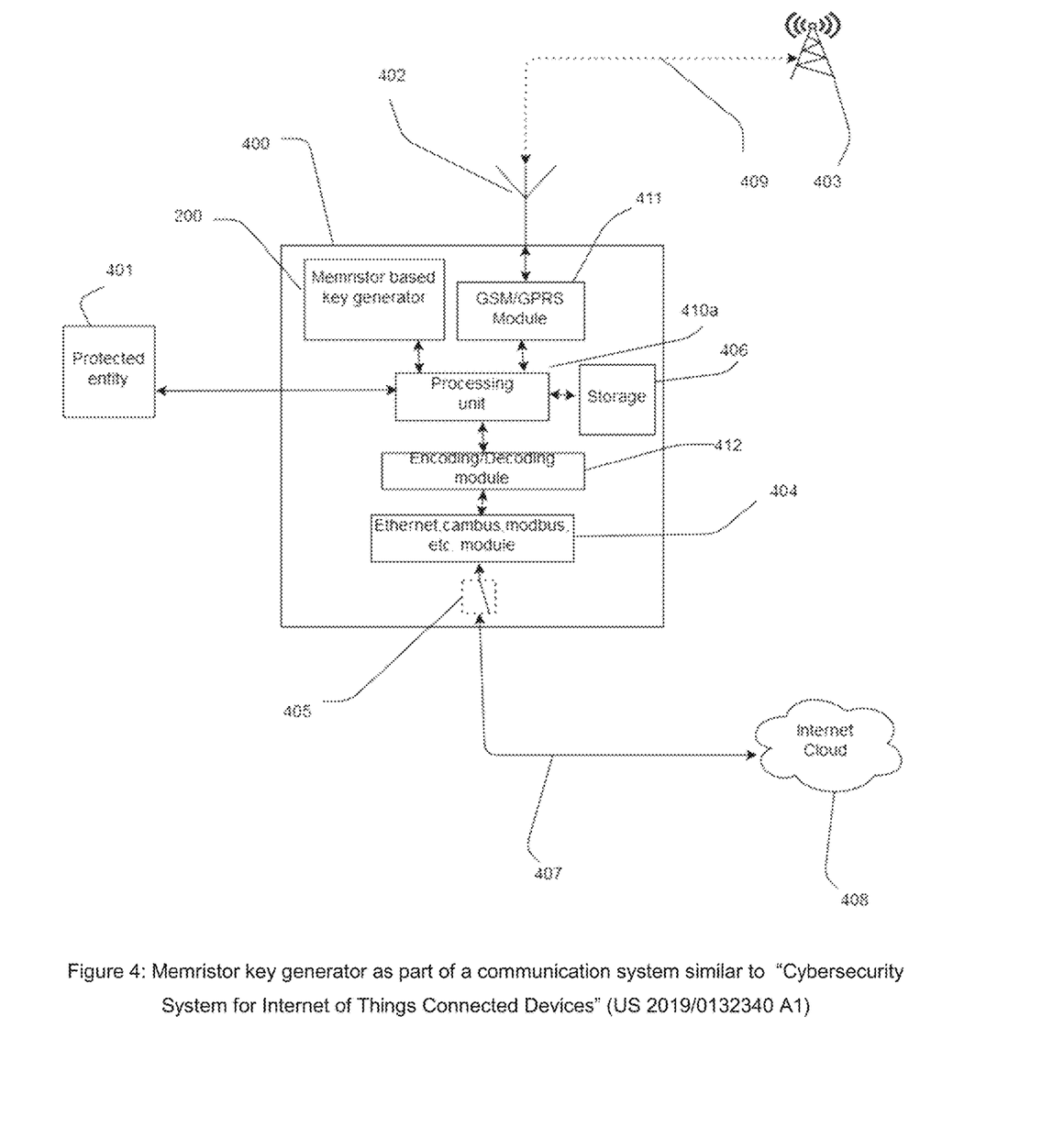
FIG. 4 is a system using the key generation method and an encryption algorithm to secure safe data transfer between devices.

The system of FIG. 4 may also be used to implement a one-time pad, also called the Vernam cypher, which is mathematically proven to be unbreakable, if all the conditions are met. The conditions of Vernam cypher are the following: (1) the key must be truly random; (2) the key must be at least the same size as the text that needs to be encrypted; (3) the key is never reused in whole or in part; (4) the key is kept completely secret. If all of these conditions are met, the resulting cipher text is unbreakable. Using the system of FIG. 4, all the conditions of the encryption algorithm above are met. The first condition (1) is met by using the property of memristor to generate completely random values, this being used to generate completely random voltage sweep values that are applied to the memristor matrix to generate the encryption key. The second condition (2) is met by simply generating as many voltage sweep values are needed to generate an encryption key the same size, or bigger than the plaintext that needs to be encrypted. The third condition (3) is met by destroying the key immediately after being used to encrypt data, and generating another completely random key the next time a plaintext needs to be encrypted, by using the property of memristors to generate completely random values; also, during the encryption and the sending of voltage values from the sender device to the receiver device, the system is isolated from the Ethernet channel by opening the contacts of two relays (one placed between the protected device and the system, and another placed between the system and the Ethernet cloud) of another possible embodiment of the system described in FIG. 4, so no one can get inside the system during the encryption process to steal the encryption key. The last condition of the Vernam cypher is met, firstly by destroying the key immediately after the encryption, and by delivering the voltage values (to the receiver of the data transferred over the Ethernet) that can only be used on the memristor matrix of the receiver of data to generate the unique encryption key that must be used to decrypt data.

As specified previously, even if the voltage values sent over the GSM are intercepted, it would be impossible to generate the decryption key, unless they have one memristor matrix identical to the one existing in the receiver or sender device. It was demonstrated that it is almost impossible to reproduce the characteristics of memristors since input production parameters are different from one batch to another. The most relevant example is the "sputtering" technological step where the parameters of the memristor material are affected by the wearing of the target, composition of the atmosphere inside of the reactor as well as the wearing of the magnetron. The uncontrollable variation of all these parameters make almost impossible to obtain material with identical parameters.

Figure 5:
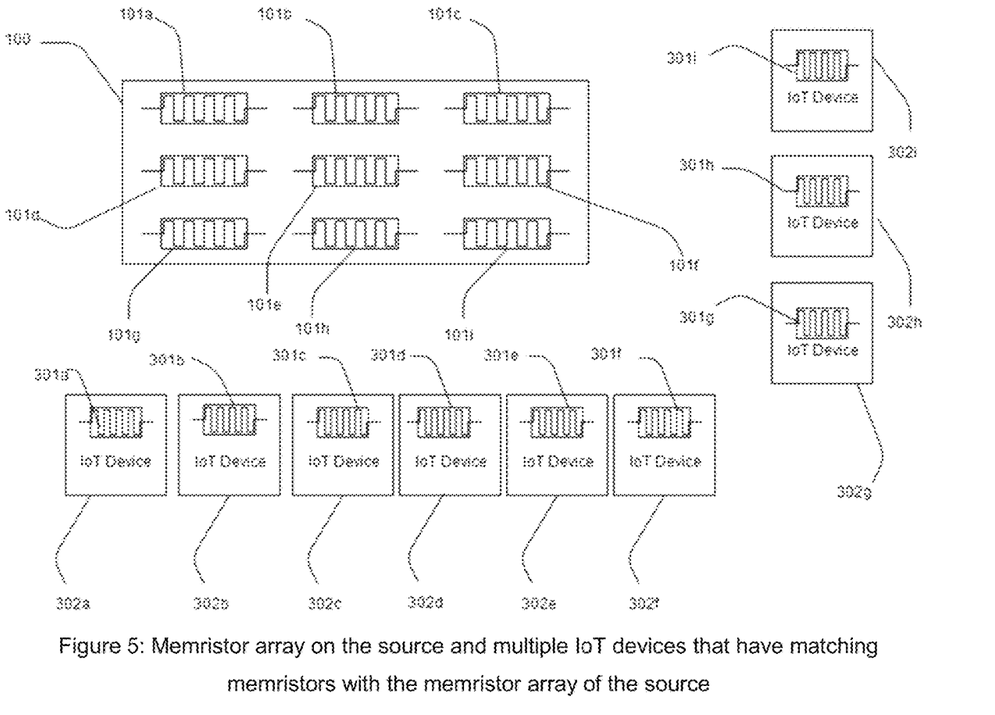
FIG. 5 is a system using the encryption method based on memristors for IoT devices.

For IoT devices, another method, similar to the one explained above can be used. However, instead of having a matrix of memristors on both the source and destination, we may only use one or a few memristors for each IoT device, as it can be seen in FIG. 5 where memristor (101*a*) can generate a matching key with the memristor (501*a*) of the IoT device (502*a*). The system (100) can be placed on a server or a device that collects data coming from IoT devices or that sends data (like updates) to IoT devices; this system will be able to generate encryption and decryption keys for each IoT device that is assigned to it. Each IoT device that is assigned to the system containing the memristor matrix (100) will have a memristor capable of generating a matching encryption key with the one on the device that contains the memristor matrix to encrypt and decrypt the data it sends to the IoT devices. This way, the IoT devices will only be able to communicate with only one system, as no other system will be able to generate the encryption key needed to send and receive data to it. This can be achieved by using an encryption algorithm that doesn't use much processing power and is capable of doing data integrity checking (like the AES algorithm, that can be easily implemented at hardware level).

Figure 6:
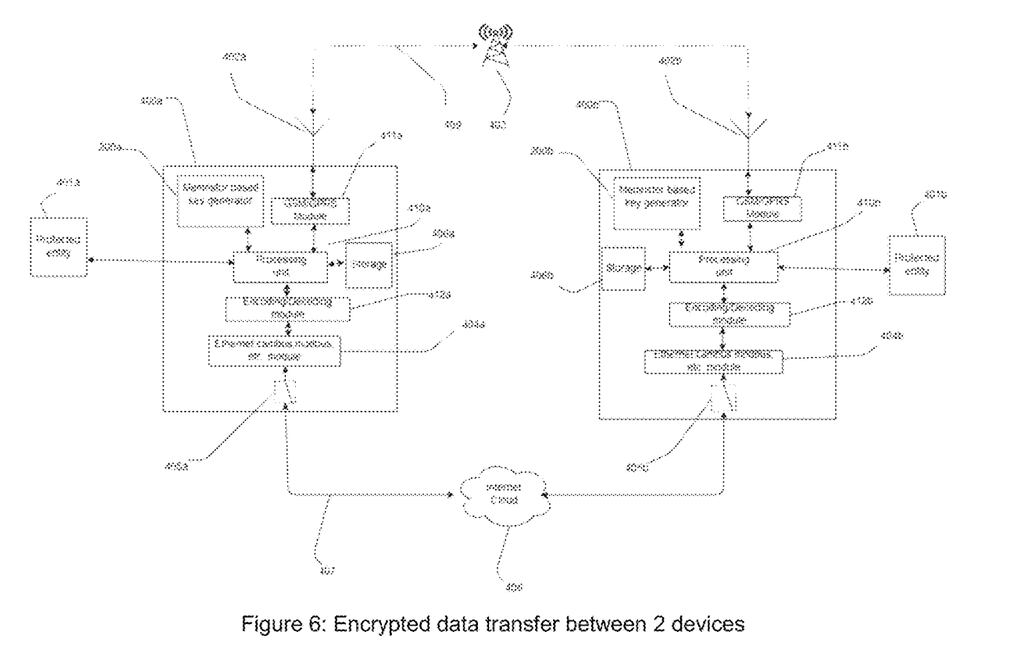
FIG. 6 is used to describe how two of the systems of FIG. 4, placed on two endpoints (or 2 separate devices), communicate.

The complete process of communication is explained herein based on FIG. 6, which represents one of the possible embodiments of the secure way of communication (various other embodiments are possible), one of those systems being placed before each of two separate endpoints (protected devices). In this embodiment of the system a physical relay is used, for opening/closing the connection to the Ethernet channel; in this particular embodiment the relay (405*a*) is initially open (the connection is closed). When the sender (401*a*) wants to send data to the receiver (401*b*), the data is sent to the internal storage (406*a*). Random voltage read values may then be generated (this can be done using a memristor) and be used to generate multiple output values such as electrical resistance values or corresponding voltages or currents, by applying them to the memristors of the memristor based key generator (200*a*). These output values are translated using a table similar to the one described in FIG. 3. Using this key, the data is encrypted using an algorithm that can do data validation, this algorithm may also be hardware implemented (412*a*)(412*b*). The plaintext data may be deleted after the encrypted data is ready and the relay (405*a*) closes (opening the Ethernet connection), while also sending a signal over the GSM channel (409) by using a GSM module (411*a*) to the system placed on the receiver (401*b*) to close the relay (405*b*), so that it can receive data over the Ethernet. The data is sent from the system (400*a*) placed on the sender device (401*a*), to the system (400*b*) placed on the receiver (401*b*), while the voltage values used to generate the right key, (like shown in FIG. 3) that were generated on the system (400*a*) placed on the sender (401*a*) are sent over the GSM channel (409) to the system (400*b*) placed on the receiver (401*b*). When the system (400*b*) receives both the data from the Ethernet channel (407) and the voltage values from the GSM channel (409), it opens the relay (405*b*) closing the Ethernet connection. Using the voltage values received, the system (400*b*) generates the encryption key needed to decrypt the data received over the Ethernet, using the memristor based key generator (200*b*) placed on it. The encrypted data is then transformed into plaintext (decryption) using the key generated and is sent to the receiver (401*b*). Various other methods of both encrypting the data, including stream cypher for the embodiment of the system (400) where the Ethernet channel (407) is open by default, by the closed contacts of the relay (405), may be used, but the basis of all types of encryption, on all embodiments is the memristor based key generator (200).

What is claimed is:

1. A method of generating encryption keys on multiple devices, without transferring the keys comprising:
    setting a plurality of sender memristors using a plurality of sender setting values;
    applying a sender reading value to each of the plurality of sender memristors to generate a plurality of sender output values;
    determining a plurality of strings of characters from the plurality of sender output values based on a sender table;
    encrypting data with a combination of the plurality of strings of characters;
    transmitting the encrypted data to a receiver through a first channel;
    transmitting at least one receiver setting value associated with at least one sender setting value or at least one receiver reading value associated with at least one sender reading value or both to the receiver through a second channel different from the first channel;
    applying the at least one receiver setting value or the at least one receiver reading value or both to at least one receiver memristor to generate at least one receiver output value;
    using a receiver table to determine the combination of the plurality of strings of characters from the at least one receiver output value; and
    decrypting the encrypted data with the combination of the plurality of strings of characters from the receiver table.

2. The method of claim 1, wherein the sender setting value includes at least one voltage sweep or pulse which is changed to generate different strings of characters.

3. The method of claim 1, wherein:
the encrypting and decrypting employs a Vernam cypher or a one-time pad;
the combination of the plurality of strings of characters is the same length or longer than the data to be encrypted;
the first channel is closed during the encrypting and the decrypting; and
during the transmitting of the encrypted data, the combination of the plurality of strings of characters is not present in the sender or the receiver.

4. The method of claim 1, wherein the sender includes an IOT device.

5. The method of claim 1, wherein the sender table and the receiver table is the same table.

6. The method of claim 1, wherein the first channel employs an Ethernet protocol and the second channel employs a GSM, GPRS, CDMA, LTE or G5 based protocol.

7. The method of claim 1, further comprising deleting the data in plaintext after the encrypting.

8. The method of claim 1, further comprising disconnecting the sender from the first channel during the encrypting and disconnecting the receiver from the first channel during the decrypting.

9. A system used for generating encryption keys on multiple devices and for encrypted data transfer between two or multiple devices comprising:
a sender including a plurality of sender memristors, a sender generator constructed and arranged to generate a plurality of sender setting values or a plurality of sender reading values or both, a sender encryption engine and a sender table;
a receiver including at least one receiver memristor, a receiver decryption engine, and a receiver table;
a first channel coupling the sender and the receiver; and
a second channel, different from the first channel, coupling the sender and the receiver, wherein:
the sender generator applies the plurality of sender setting values or the plurality of sender reading values or both to the plurality of sender memristors to cause the plurality of sender memristors to generate a plurality of sender output values,
the sender applies the plurality of the sender output values to the sender table to create a plurality of strings of characters,
the sender encryption engine encrypts data using a combination of the plurality of strings of characters,
the sender transmits the encrypted data to the receiver over the first channel to the receiver,
the sender transmits at least one receiver setting value associated with at least one setting value or at least one receiver reading value associated with at least one reading value or both to the receiver over the second channel,
the receiver generator applies the at least one receiver setting value or the at least one receiver reading value or both, to the at least one receiver memristor to cause the receiver memristor to generate at least one receiver output value,
the receiver applies the at least one receiver output value to the receiver table to create the combination of the plurality of strings of characters from the at least one receiver output value, and
the receiver decryption engine generates the data from the encrypted data using the combination of the plurality of strings of characters.

10. The system of claim 9, wherein the first channel is a wired channel and the second channel is a wireless channel.

11. The system of claim 10, wherein the first channel employs an Ethernet protocol and the second channel employs a GSM, GPRS, CDMA, LTE or G5 based protocol.

12. The system of claim 9, wherein:
the encryption engine and the decryption engine employ a one-time pad encryption algorithm;
the system further comprises at least one relay to disable the first channel when the encryption engine or the decryption engine is operating; and
the plurality of sender memristors causes the sender table to generate a completely random string of characters for each encryption.

13. The system of claim 9, wherein the sender includes an IOT device.

14. The system of claim 9, wherein the sender table and the receiver table is the same table.

15. The system of claim 9, wherein the sender deletes the data in plaintext after the encrypting.

16. The system of claim 9, further wherein the sender disconnects from the first channel during the encrypting and the receiver disconnects from the first channel during the decrypting.

* * * * *